US012596488B2

(12) United States Patent
Jeon

(10) Patent No.: US 12,596,488 B2
(45) Date of Patent: Apr. 7, 2026

(54) STORAGE DEVICE AND METHOD OF OPERATING THE SAME

(71) Applicant: SK hynix Inc., Gyeonggi-do (KR)

(72) Inventor: Jeong Ho Jeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 136 days.

(21) Appl. No.: 17/953,829

(22) Filed: Sep. 27, 2022

(65) Prior Publication Data

US 2023/0315308 A1 Oct. 5, 2023

(30) Foreign Application Priority Data

Mar. 29, 2022 (KR) ........................ 10-2022-0038968

(51) Int. Cl.
G06F 3/06 (2006.01)

(52) U.S. Cl.
CPC .......... G06F 3/0625 (2013.01); G06F 3/0634 (2013.01); G06F 3/0653 (2013.01); G06F 3/0679 (2013.01)

(58) Field of Classification Search
CPC ............. G06F 11/3034; G06F 11/3058; G06F 11/3062; G06F 3/0616; G06F 3/0625; G06F 3/0634; G06F 3/0653; G06F 3/0658; G06F 3/0679
See application file for complete search history.

(56) References Cited

U.S. PATENT DOCUMENTS

| | | | |
|---|---|---|---|
| 6,865,398 B2* | 3/2005 | Mangal ................. | H04W 68/00 370/347 |
| 2009/0076630 A1* | 3/2009 | Okamoto ............ | G06F 11/0739 700/7 |
| 2019/0035460 A1* | 1/2019 | Terada ............... | G11C 13/0069 |

FOREIGN PATENT DOCUMENTS

| | | |
|---|---|---|
| KR | 10-2016-0035555 A | 3/2016 |
| KR | 10-2021-0033726 A | 3/2021 |

* cited by examiner

*Primary Examiner* — Yong J Choe
(74) *Attorney, Agent, or Firm* — IP & T GROUP LLP

(57) ABSTRACT

Provided herein may be a storage device and a method of operating the same. The method of operating a storage device may include receiving, from an external device, a request to change a set value used for an operation of monitoring an auxiliary power supply of the storage device, changing the set value in response to the request, and performing the operation based on the changed set value.

17 Claims, 16 Drawing Sheets

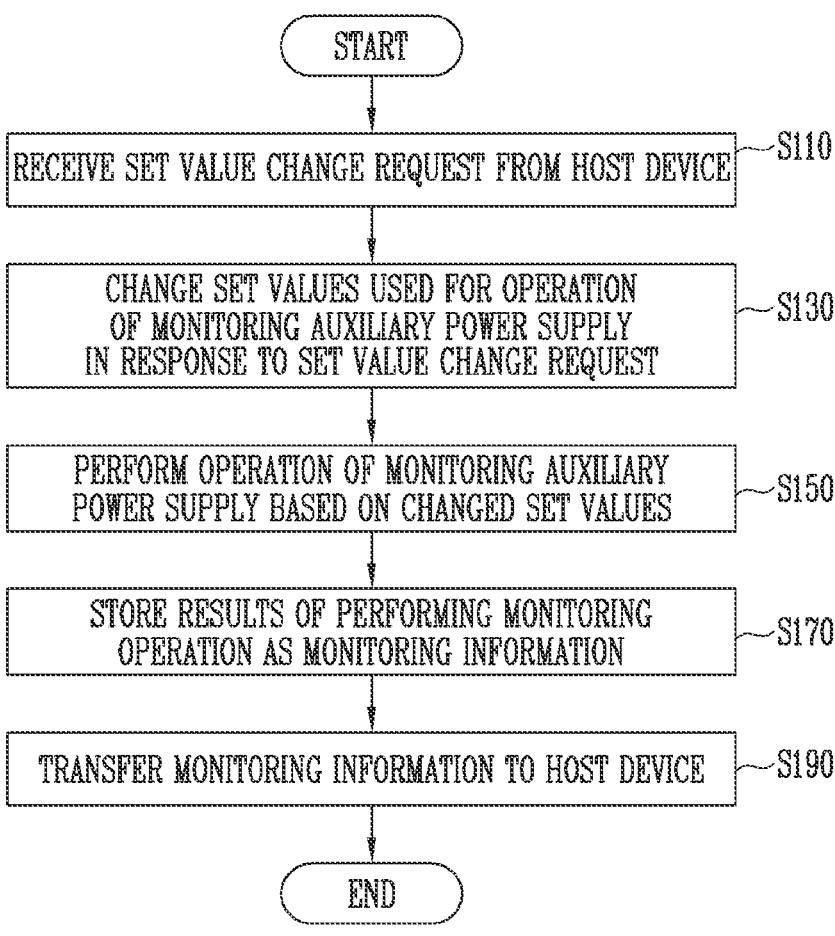

START

RECEIVE SET VALUE CHANGE REQUEST FROM HOST DEVICE — S110

CHANGE SET VALUES USED FOR OPERATION
OF MONITORING AUXILIARY POWER SUPPLY
IN RESPONSE TO SET VALUE CHANGE REQUEST — S130

PERFORM OPERATION OF MONITORING AUXILIARY
POWER SUPPLY BASED ON CHANGED SET VALUES — S150

STORE RESULTS OF PERFORMING MONITORING
OPERATION AS MONITORING INFORMATION — S170

TRANSFER MONITORING INFORMATION TO HOST DEVICE — S190

END

450
Va

400

401 402 403 404 405 406 407 408 409

REQUIRED POWER SPARE POWER

450
Va

400

401 402 403 404 405 406 407 408 409

DEFECT
OCCURS

REQUIRED POWER SPARE
POWER

STORAGE DEVICE AND METHOD OF OPERATING THE SAME

CROSS-REFERENCE TO RELATED APPLICATION

The present application claims priority under 35 U.S.C. § 119 (a) to Korean patent application number 10-2022-0038968, filed on Mar. 29, 2022, the entire disclosure of which is incorporated herein by reference, BACKGROUND

FIELD OF INVENTION

Various embodiments of the present disclosure generally relate to an electronic device, and more particularly to a storage device and a method of operating the storage device.

DESCRIPTION OF RELATED ART

A semiconductor memory device may have a two-dimensional (2D) structure in which strings are horizontally arranged on a semiconductor substrate. Alternatively, the semiconductor memory device may have a three-dimensional (3D) structure in which strings are vertically stacked on a semiconductor substrate. As the semiconductor memory device having a 2D structure is reaching its physical scaling limit (i.e., limit in the degree of integration), semiconductor manufacturers are producing 3D semiconductor memory devices that include a plurality of memory cells vertically stacked on a semiconductor substrate. Moreover, a controller may control the operation of a semiconductor memory device in response to a request received from a host device.

SUMMARY

Various embodiments of the present disclosure are directed to a storage device that is capable of efficiently monitoring auxiliary power, and a method of operating the storage device.

An embodiment of the present disclosure may provide for a method of operating a storage device. In the method of operating the storage device, a request to change a set value used for an operation of monitoring an auxiliary power supply of the storage device may be received from an external device, the set value may be changed in response to the request, and the operation may be performed based on the changed set value.

An embodiment of the present disclosure may provide for a storage device. The storage device may include a semiconductor memory device, an auxiliary power supply, and a controller. The semiconductor memory device may include a plurality of memory cells. The auxiliary power supply may be configured to supply an auxiliary supply voltage to the semiconductor memory device when external power supplied to the semiconductor memory device is interrupted. The controller may be configured to control operations of the semiconductor memory device and the auxiliary power supply. The controller may include a power monitor configured to change a set value used for an operation of monitoring the auxiliary power supply in response to a set value change request received from an external device.

An embodiment of the present disclosure may provide for an operating method of a device including an element. The operating method of the device comprises monitoring by changing, in response to a first request from an external, one or more monitoring parameters to provide the external with a result of the monitoring, and operating, in response to a second request from the external, with deficient auxiliary power supplied from the element when main power supplied to the device is interrupted, in a case that the element is determined, by the external, as incapable of supplying default auxiliary power to the device when the main power is interrupted.

BRIEF DESCRIPTION OF THE DRAWINGS

FIG. 9 is a flowchart illustrating a method of operating a storage device according to an embodiment of the present disclosure.

DETAILED DESCRIPTION

Specific structural or functional descriptions in the embodiments of the present disclosure introduced in this specification are illustrated to describe embodiments according to the concept of the present disclosure. The embodiments according to the concept of the present disclosure may be practiced in various forms, and should not be construed as being limited to the embodiments described in the specification.

Advantages and features of the present disclosure, and methods for achieving the same will be described with reference to embodiments described later in detail together with the accompanying drawings. The present disclosure is not limited to the following embodiments but may be embodied in other forms. Rather, these embodiments are provided so that the present disclosure will be thorough and complete, and will fully convey the technical spirit of the disclosure to those skilled in the art.

Figure 1:
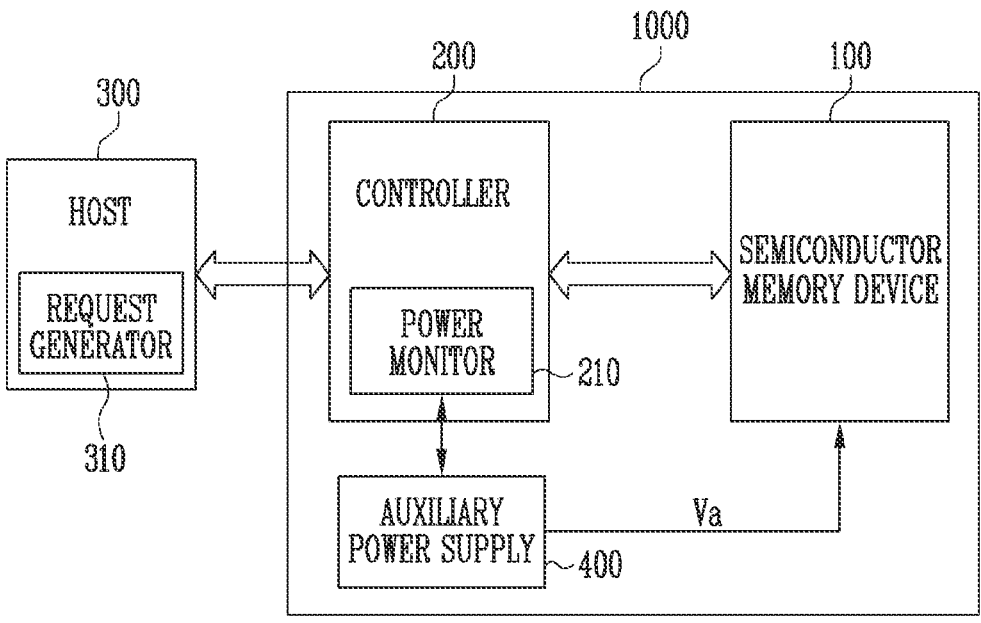
FIG. 1 is a block diagram illustrating a storage device, including a controller, and a host device according to an embodiment of the present disclosure.

FIG. 1 is a block diagram illustrating a storage device 1000, including a controller 200, and a host device 300 according to an embodiment of the present disclosure.

Referring to FIG. 1, the storage device 1000 includes a semiconductor memory device 100, a controller 200, and an auxiliary power supply 400. Further, the storage device 1000 communicates with an external device. In an embodiment, the external device may be the host device 300. In the present specification, although the storage device 1000 is described as communicating with the host device 300, the present disclosure is not limited thereto. That is, in addition to the host device 300, various types of devices communicating with the storage device 1000 may also be included in the external device.

The controller 200 controls the overall operation of the semiconductor memory device 100. Further, the controller 200 controls the operation of the semiconductor memory device 100 in response to an operation request received from the host device 300.

The semiconductor memory device 100 is operated under the control of the controller 200. The semiconductor memory device 100 includes a memory cell array having a plurality of memory blocks. In an embodiment, the semiconductor memory device 100 may be a nonvolatile memory device. For example, the semiconductor memory device 100 may include at least one of a flash memory device, a phase-change random access memory (PCRAM), a magnetoresistive RAM (MRAM), and a resistive RAM (ReRAM).

The controller 200 may receive a data write request, a read request, a trim request, etc. from the host device 300, and may control the semiconductor memory device 100 in response to the received requests. In detail, the controller 200 may generate commands for controlling the operation of the semiconductor memory device 100, and may transmit the commands to the semiconductor memory device 100.

The semiconductor memory device 100 may receive a command and an address from the controller 200, and may access the area of the memory cell array, selected by the address. That is, the semiconductor memory device 100 performs an internal operation corresponding to the command on the area selected by the address.

For example, the semiconductor memory device 100 may perform a program operation, a read operation, and an erase operation. During a program operation, the semiconductor memory device 100 may program data to the area selected by the address. During a read operation, the semiconductor memory device 100 may read data from the area selected by the address. During an erase operation, the semiconductor memory device 100 may erase data stored in the area selected by the address.

The auxiliary power supply 400 may provide auxiliary power for driving the controller 200 and the semiconductor memory device 100. In a normal situation, the controller 200 and the semiconductor memory device 100 of the storage device 1000 may be driven by externally supplied power. Here, the auxiliary power supply 400 may not perform a power supply operation.

However, in an exceptional situation, the supply of external power may be suddenly interrupted. When such a sudden power-off (SPO) occurs, the auxiliary power supply 400 may temporarily supply auxiliary power to the controller 200 and to the semiconductor memory device 100. For example, as shown in FIG. 1, the auxiliary power supply 400 may provide an auxiliary supply voltage Va to the semiconductor memory device 100.

The controller 200 may include a power monitor 210. The power monitor 210 may control a monitoring operation of checking the current state of the auxiliary power supply 400. In an embodiment, the monitoring operation may be performed in response to a request from the host device 300. In an embodiment, the monitoring operation may be performed regardless of the host device 300. For example, the controller 200 may determine to perform the operation of monitoring the auxiliary power supply 400 at intervals of a preset time period.

The host device 300 includes a request generator 310. The request generator 310 may generate various requests to be transferred to the storage device 1000. For example, the request generator 310 of the host device 300 may generate a write request to store data in the storage device 1000, and may transfer the generated write request and write data corresponding thereto to the storage device 1000. The storage device 1000 may store the received write data in the semiconductor memory device 100 in response to the received write request. In an example, the request generator 310 of the host device 300 may generate a read request to read data from the storage device 1000, and may transfer the generated read request to the storage device 1000. The storage device 1000 may read the data stored in the semiconductor memory device 100 in response to the received read request, and may transfer the read data to the host device 300.

In addition, the request generator 310 of the host device 300 may generate a request to change set values used for the overall operation of the storage device 1000, and may transfer the generated request to the storage device 1000. The storage device 1000 may change the set values used for the operation of the storage device 1000 in response to the received request. The set values used for the operation of the storage device 1000 may include, for example, the frequency with which a garbage collection operation is performed or set values related to the operation of monitoring the auxiliary power supply 400.

Further, the request generator 310 of the host device 300 may generate a request to receive information about the current state of the storage device 1000, and may transfer the generated request to the storage device 1000. The storage device 1000 may transfer the information about the current state of the storage device 1000 to the host device 300 in response to the received request. Examples of the information about the current state of the storage device 1000 may include the current temperature of the storage device 1000, a write amplification factor (WAF) of the storage device 1000, the state of the auxiliary power supply 400 of the storage device, etc.

The auxiliary power supply 400 may include any component capable of temporarily providing the auxiliary supply voltage Va to the controller 200 and the semiconductor memory device 100. For example, the auxiliary power supply 400 may include at least one of an electric double layer capacitor (EDLC), a conductive polymer tantalum solid capacitor, a multilayer ceramic capacitor, an aluminum electrolytic capacitor, and a film capacitor.

When the auxiliary power supply 400 is composed of capacitors, there may occur a situation in which defects occur in the capacitors in use and in which an auxiliary supply voltage is not smoothly provided to the controller 200 and the semiconductor memory device 100 in the event of an SPO due to a change in the capacitance of the capacitors. Therefore, in accordance with an embodiment of the present disclosure, the request generator 310 of the host device 300 may generate a request to change set values used for the operation of monitoring the auxiliary power supply 400 included in the storage device 1000, and may transfer the generated request to the storage device 1000. The storage device 1000 may change the set values used for the operation of the auxiliary power supply 400 in response to the received request. The set values used for the operation of the auxiliary power supply 400 may include, for example, a time period during which a monitoring operation is performed, the reference charged/discharged voltages of the auxiliary power supply 400, etc.

Furthermore, in accordance with an embodiment of the present disclosure, the request generator 310 of the host device 300 may generate a request to receive information about the current state of the auxiliary power supply 400 of the storage device 1000, and may transfer the generated request to the storage device 1000. The storage device 1000 may transfer monitoring information, indicating the results of monitoring performed on the auxiliary power supply 400, to the host device 300 in response to the received request. The monitoring information may include the times required for charging/discharging of the auxiliary power supply 400 performed using the set reference charged/discharged voltages, information about the occurrence or non-occurrence of defects in each of a plurality of capacitors included in the auxiliary power supply 400, etc.

In this way, in accordance with the embodiment of the present disclosure, the host device 300 may control the set values used for the operation of monitoring the auxiliary power supply 400 of the storage device 1000 in response to the request generated by the request generator 310. Accordingly, the operation of monitoring the auxiliary power supply 400 of the storage device 1000 is controlled.

Furthermore, in accordance with the embodiment of the present disclosure, the host device 300 may receive monitoring information related to the current state of the auxiliary power supply 400 of the storage device 1000 in response to the request generated by the request generator 310. The host device 300 may change the set values used for the overall operation of the storage device 1000 or change the operation mode of the storage device 1000 based on the received monitoring information.

Accordingly, even if the performance of the auxiliary power supply 400 is degraded, the host device 300 may maximally efficiently use the storage device 1000.

Figure 2:
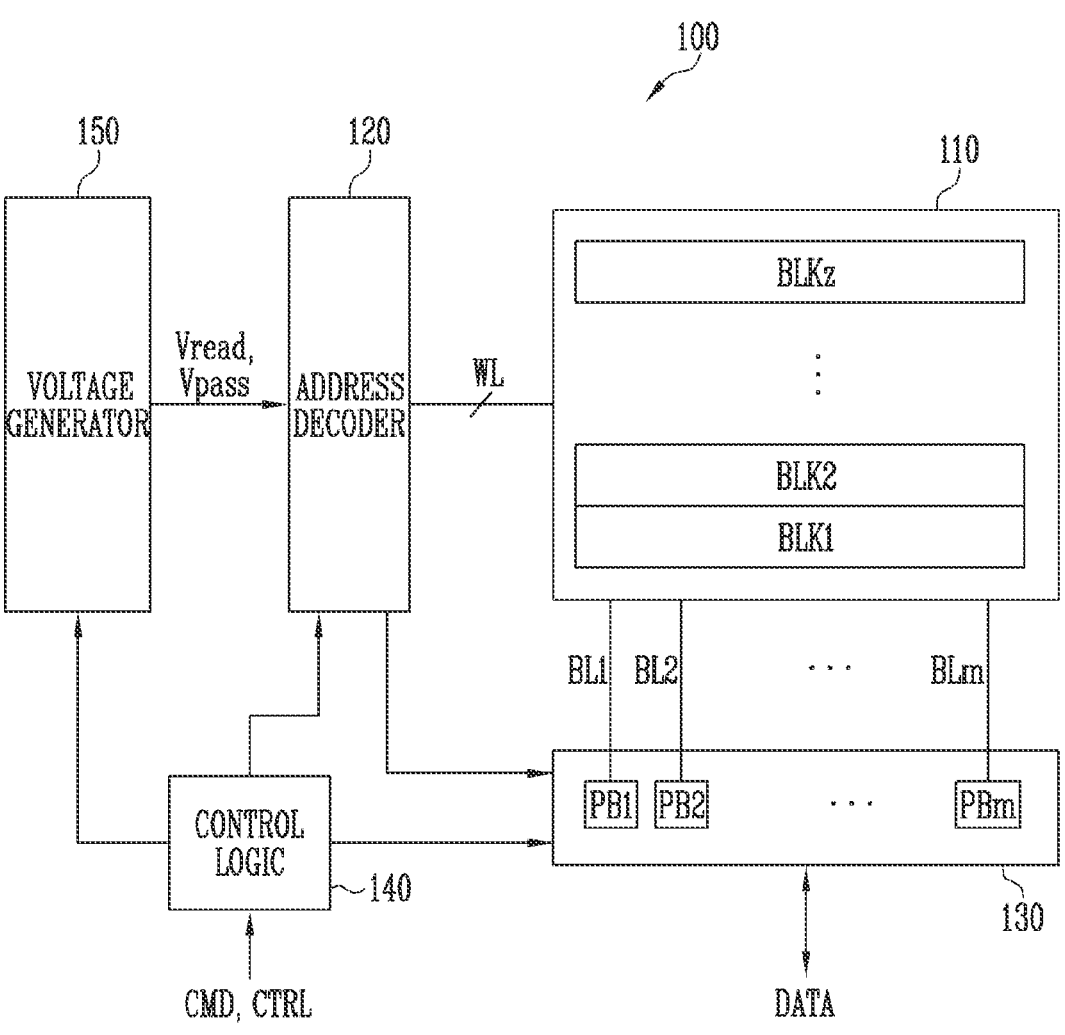
FIG. 2 is a block diagram illustrating a semiconductor memory device according to an embodiment of the present disclosure.

FIG. 2 is a block diagram illustrating a semiconductor memory device according to an embodiment of the present disclosure.

Referring to FIG. 2, a semiconductor memory device 100 includes a memory cell array 110, an address decoder 120, a read and write circuit 130, a control logic 140, and a voltage generator 150.

The memory cell array 110 may include a plurality of memory blocks BLK1 to BLKz. The memory blocks BLK1 to BLKz are coupled to the address decoder 120 through word lines WL. The memory blocks BLK1 to BLKz are coupled to the read and write circuit 130 through bit lines BL1 to BLm. Each of the memory blocks BLK1 to BLKz includes a plurality of memory cells. In an embodiment, the plurality of memory cells may be nonvolatile memory cells, and may be implemented as nonvolatile memory cells having a vertical channel structure. The memory cell array 110 may be implemented as a memory cell array having a two-dimensional (2D) structure. In an embodiment, the memory cell array 110 may be implemented as a memory cell array having a three-dimensional (3D) structure. Moreover, each of the memory cells included in the memory cell array may store at least one bit of data. In an embodiment, each of the memory cells included in the memory cell array 110 may be a single-level cell (SLC), which stores one bit of data. In an embodiment, each of the memory cells included in the memory cell array 110 may be a multi-level cell (MLC), which stores 2 bits of data. In an embodiment, each of the memory cells included in the memory cell array 110 may be a triple-level cell (TLC), which stores 3 bits of data. In an embodiment, each of the memory cells included in the memory cell array 110 may be a quad-level cell (QLC), which stores 4 bits of data. In accordance with an embodiment, the memory cell array 110 may include a plurality of memory cells, each of which stores 5 or more bits of data.

The address decoder 120, the read and write circuit 130, the control logic 140, and the voltage generator 150 may function as a peripheral circuit for driving the memory cell array 110. The address decoder 120 is coupled to the memory cell array 110 through the word lines WL. The address decoder 120 may be operated under the control of the control logic 140. The address decoder 120 receives addresses through an input/output buffer (not illustrated) provided in the semiconductor memory device 100.

The address decoder 120 may decode a block address, among the received addresses. The address decoder 120 selects at least one memory block based on the decoded block address. When a read voltage apply operation is performed during a read operation, the address decoder 120 may apply a read voltage Vread, generated by the voltage generator 150, to a selected word line of a selected memory block, and may apply a pass voltage Vpass to the remaining word lines, that is, unselected word lines. Further, during a program verify operation, the address decoder 120 may apply a verify voltage, generated by the voltage generator 150, to the selected word line of the selected memory block, and may apply the pass voltage Vpass to the unselected word lines.

The address decoder 120 may decode a column address, among the received addresses. The address decoder 120 may transmit the decoded column address to the read and write circuit 130.

The read and program operations of the semiconductor memory device 100 are each performed on a page basis. Addresses received in response to requests for the read and program operations may include a block address, a row address, and a column address. The address decoder 120 may select one memory block and one word line according to the block address and the row address. The column address may be decoded by the address decoder 120, and may then be provided to the read and write circuit 130.

The address decoder 120 may include a block decoder, a row decoder, a column decoder, an address buffer, etc.

The read and write circuit 130 includes a plurality of page buffers PB1 to PBm. The read and write circuit 130 may be operated as a "read circuit" during a read operation on the memory cell array 110 and as a "write circuit" during a write operation. The plurality of page buffers PB1 to PBm may be coupled to the memory cell array 110 through the bit lines BL1 to BLm. In order to sense threshold voltages of the memory cells during a read operation and a program verify operation, each of the page buffers PB1 to PBm may sense, through a sensing node, a change in the amount of flowing current depending on the program state of a corresponding memory cell and latch the sensed change as sensing data while continuously supplying sensing current to the bit lines coupled to the memory cells. The read and write circuit 130 is operated in response to page buffer control signals output from the control logic 140.

During a read operation, the read and write circuit 130 may sense data stored in the memory cells and temporarily store read data, and may then output data DATA to the input/output buffer (not illustrated) of the semiconductor memory device 100. In an embodiment, the read and write circuit 130 may include a column select circuit or the like as well as the page buffers (or page registers).

The control logic 140 is coupled to the address decoder 120, the read and write circuit 130, and the voltage generator 150. The control logic 140 may receive a command CMD and a control signal CTRL through the input/output buffer (not illustrated) of the semiconductor memory device 100. The control logic 140 may control the overall operation of the semiconductor memory device 100 in response to the control signal CTRL. The control logic 140 may output a control signal for controlling a precharge potential level at the sensing node of the plurality of page buffers PB1 to PBm. The control logic 140 may control the read and write circuit 130 to perform a read operation on the memory cell array 110.

The voltage generator 150 may generate the read voltage Vread and the pass voltage Vpass required for a read operation in response to the control signal output from the control logic 140. The voltage generator 150 may include a plurality of pumping capacitors for receiving the internal supply voltage to generate a plurality of voltages having various voltage levels, and may generate a plurality of voltages by selectively enabling the plurality of pumping capacitors under the control of the control logic 140.

The address decoder 120, the read and write circuit 130, and the voltage generator 150 may function as a "peripheral circuit" which performs a read operation, a write operation, and an erase operation on the memory cell array 110. The peripheral circuits may perform the read operation, the write operation, and the erase operation on the memory cell array 110 under the control of the control logic 140.

Figure 3:
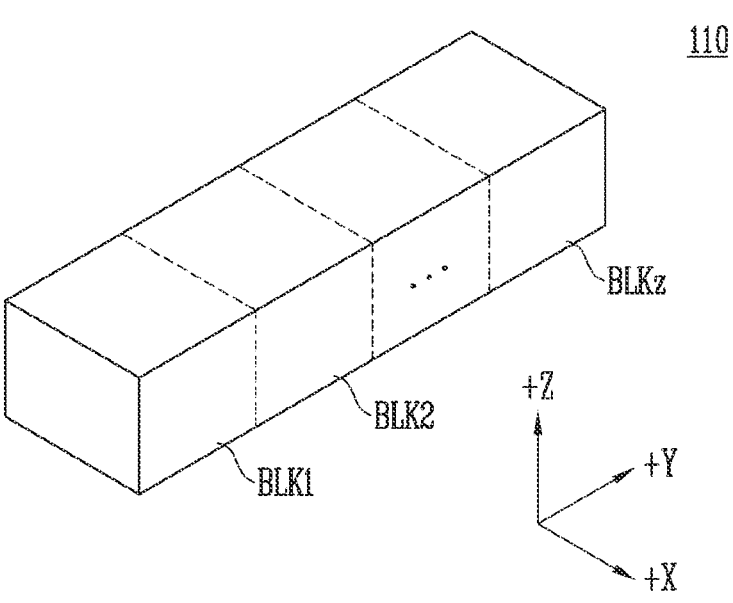
FIG. 3 is a diagram illustrating a memory cell array of FIG. 2 according to an embodiment of the present disclosure.

FIG. 3 is a diagram illustrating the memory cell array of FIG. 2 according to an embodiment of the present disclosure.

Referring to FIG. 3, the memory cell array 110 includes a plurality of memory blocks BLK1 to BLKz. Each of the memory blocks may have a three-dimensional (3D) structure. Each of the memory blocks may include a plurality of memory cells stacked on a substrate. The plurality of memory cells are arranged in +X, +Y, and +Z directions. The structure of each memory block will be described in greater detail below with reference to FIGS. 4 and 5.

Figure 4:
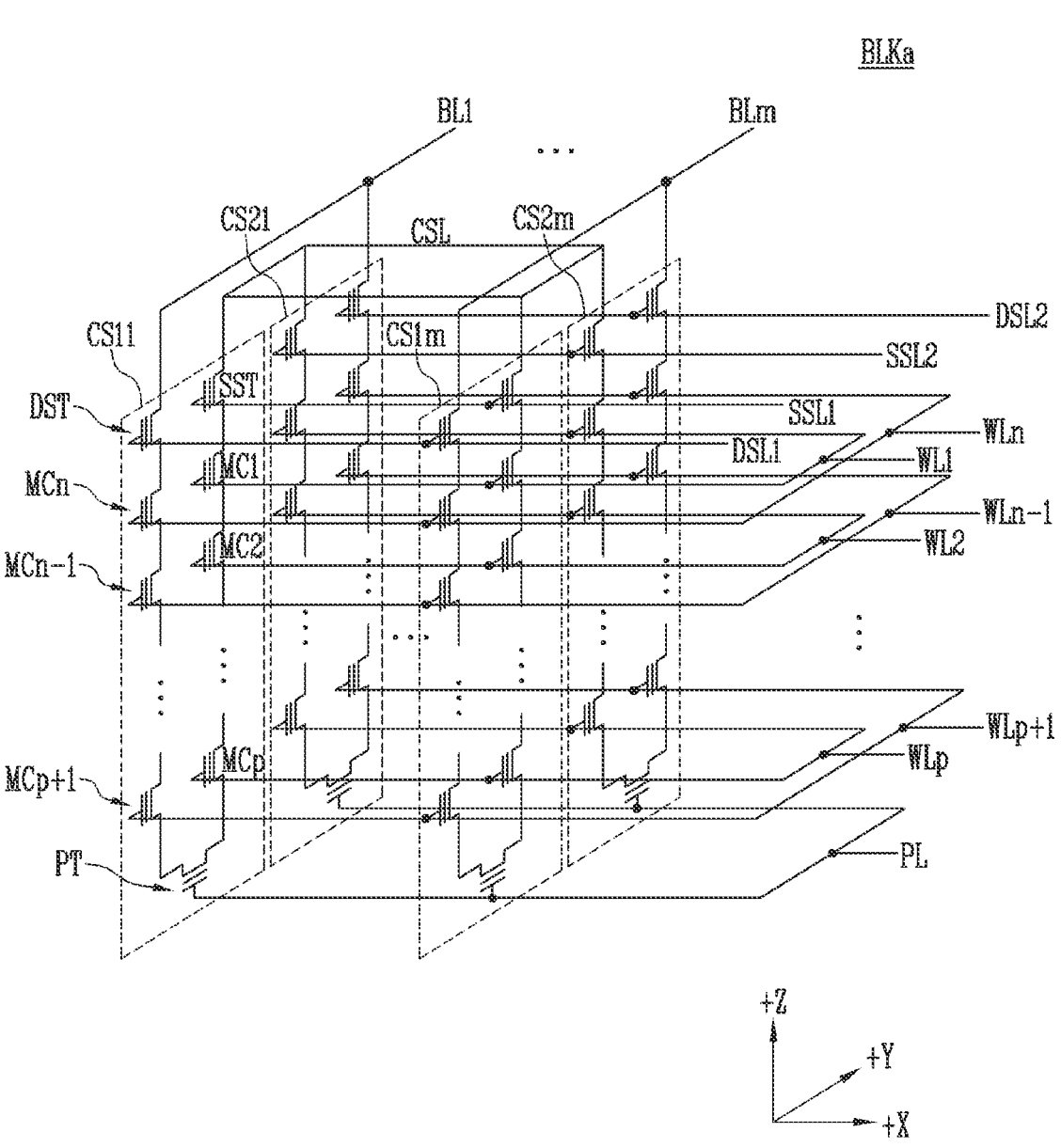
FIG. 4 is a circuit diagram illustrating a memory block BLKa of memory blocks BLK1 to BLKz of FIG. 3 according to an embodiment of the present disclosure.

FIG. 4 is a circuit diagram illustrating a memory block BLKa of the memory blocks BLK1 to BLKz of FIG. 3 according to an embodiment of the present disclosure.

Referring to FIG. 4, the memory block BLKa may include a plurality of cell strings CS11 to CS1$m$ and CS21 to CS2$m$. In an embodiment, each of the cell strings CS11 to CS1$m$ and CS21 to CS2$m$ may be formed in a 'U' shape. In the memory block BLKa, m cell strings may be arranged in a row direction (i.e., a positive (+) x direction). In FIG. 4, two cell strings are illustrated as being arranged in a column direction (i.e., a positive (+) Y direction). However, this illustration is made for convenience of description, and it will be understood that three or more cell strings may be arranged in the column direction.

Each of the cell strings CS11 to CSim and CS21 to CS2$m$ includes at least one source select transistor SST, first to n-th memory cells MC1 to MCn, a pipe transistor PT, and at least one drain select transistor DST.

The select transistors SST and DST and the memory cells MC1 to MCn may have similar structures. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between a common source line CSL and memory cells MC1 to MCp.

In an embodiment, the source select transistors of cell strings arranged in the same row are coupled to a source select line extending in a row direction, and the source select transistors of cell strings arranged in different rows are coupled to different source select lines. In FIG. 4, the source select transistors of the cell strings CS11 to CS1$m$ in a first row are coupled to a first source select line SSL1. The source select transistors of the cell strings CS21 to CS2$m$ in a second row are coupled to a second source select line SSL2.

In an embodiment, the source select transistors of the cell strings CS11 to CS1$m$ and CS21 to CS2$m$ may be coupled in common to one source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are sequentially arranged in a direction opposite to a positive (+) Z direction and are coupled in series between the source select transistor SST and the pipe transistor PT. The p+1-th to n-th memory cells MCp+1 to MCn are sequentially arranged in the +Z direction and are coupled in series between the pipe transistor PT and the drain select transistor DST. The first to p-th memory cells MC1 to MCp and the p+1-th to n-th memory cells MCp+1 to MCn are coupled to each other through the pipe transistor PT. Gates of the first to n-th memory cells MC1 to MCn of each cell string are coupled to the first to n-th word lines WL1 to WLn, respectively.

A gate of the pipe transistor PT of each cell string is coupled to a pipeline PL.

The drain select transistor DST of each cell string is coupled between the corresponding bit line and the memory cells MCp+1 to MCn. The cell strings arranged in the row direction are coupled to drain select lines extending in the row direction. The drain select transistors of the cell strings CS11 to CS1$m$ in the first row are coupled to a first drain select line DSL1. The drain select transistors of the cell strings CS21 to CS2$m$ in the second row are coupled to a second drain select line DSL2.

Cell strings arranged in the column direction may be coupled to bit lines extending in the column direction. In FIG. 4, the cell strings CS11 and CS21 in a first column are coupled to a first bit line BL1. The cell strings CS1*m* and CS2*m* in an m-th column are coupled to an m-th bit line BLm.

Memory cells coupled to the same word line in cell strings arranged in the row direction form one page. For example, memory cells coupled to the first word line WL1, among the cell strings CS11 to CS1*m* in the first row, form one page. Memory cells coupled to the first word line WL1, among the cell strings CS21 to CS2*m* in the second row, form one additional page. Cell strings arranged in the direction of one row may be selected by selecting one of the drain select lines DSL1 and DSL2. One page may be selected from the selected cell strings by selecting one of the word lines WL1 to WLn.

In an embodiment, instead of the first to m-th bit lines BL1 to BLm, even bit lines and odd bit lines may be provided. Even-numbered cell strings, among the cell strings CS11 to CS1*m* or CS21 to CS2*m* arranged in a row direction, may be coupled to respective even bit lines. Odd-numbered cell strings, among the cell strings CS11 to CS1*m* or CS21 to CS2*m* arranged in the row direction, may be coupled to respective odd bit lines.

In an embodiment, one or more of first to n-th memory cells MC1 to MCn may be used as dummy memory cells. For example, the one or more dummy memory cells are provided to reduce an electric field between the source select transistor SST and the memory cells MC1 to MCp. Alternatively, the one or more dummy memory cells are provided to reduce an electric field between the drain select transistor DST and the memory cells MCp+1 to MCn. As the number of dummy memory cells that are provided is increased, the reliability of operation of the memory block BLKa may be improved, whereas the size of the memory block BLKa may be increased. As the number of dummy memory cells that are provided is decreased, the size of the memory block BLKa may be decreased, whereas the reliability of operation of the memory block BLKa may be deteriorated.

In order to efficiently control the one or more dummy memory cells, respective dummy memory cells may have required threshold voltages. Before or after an erase operation on the memory block BLKa is performed, program operations may be performed on all or some of the dummy memory cells. When the erase operation is performed after the program operations have been performed, the respective dummy memory cells may have required threshold voltages by controlling voltages to be applied to dummy word lines coupled to respective dummy memory cells.

Figure 5:
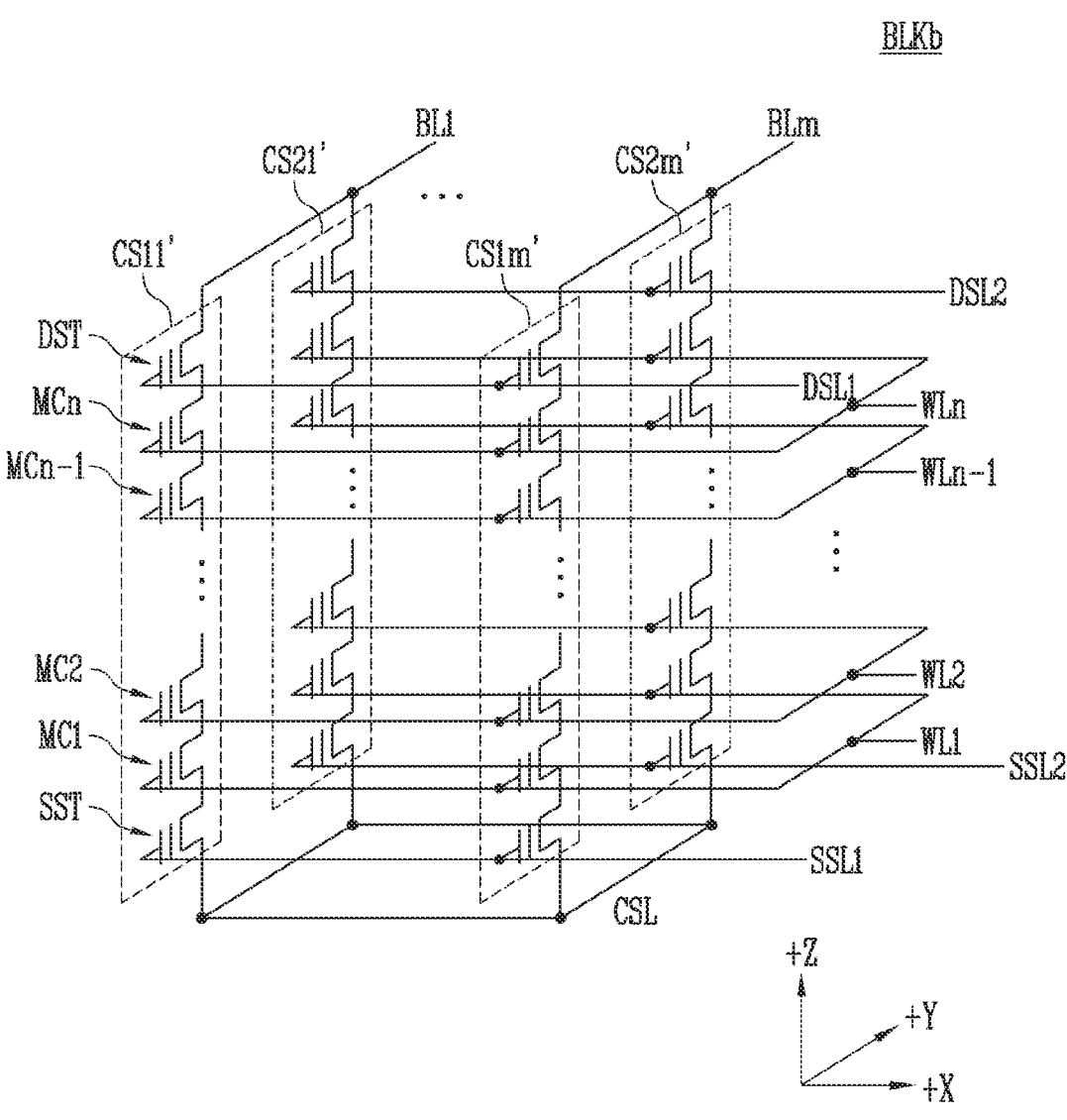
FIG. 5 is a circuit diagram illustrating an example of a memory block BLKb of the memory blocks BLK1 to BLKz of FIG. 3 according to an embodiment of the present disclosure.

FIG. 5 is a circuit diagram illustrating an example of a memory block BLKb of the memory blocks BLK1 to BLKz of FIG. 3 according to an embodiment of the present disclosure.

Referring to FIG. 5, the memory block BLKb may include a plurality of cell strings CS11' to CS1*m*' and CS21' to CS2*m*'. Each of the cell strings CS11' to CS1*m*' and CS21' to CS2*m*' extends in a positive (+) Z direction. Each of the cell strings CS11' to CS1*m*' and CS21' to CS2*m*' includes at least one source select transistor SST, first to n-th memory cells MC1 to MCn, and at least one drain select transistor DST, which are stacked on a substrate (not illustrated) below the memory block BLKb.

The source select transistor SST in each cell string is coupled between a common source line CSL and the memory cells MC1 to MCn. The source select transistors of cell strings arranged in the same row are coupled to the same source select line. The source select transistors of the cell strings CS11' to CS1*m*' arranged in a first row may be coupled to a first source select line SSL1. The source select transistors of the cell strings CS21' to CS2*m*' arranged in a second row may be coupled to a second source select line SSL2. In an embodiment, the source select transistors of the cell strings CS11' to CS1*m*' and CS21' to CS2*m*' may be coupled in common to one source select line.

The first to n-th memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. The drain select transistors of cell strings arranged in the row direction may be coupled to drain select lines extending in the row direction. The drain select transistors of the cell strings CS11' to CS1*m*' in the first row are coupled to a first drain select line DSL1. The drain select transistors of the cell strings CS21' to CS2*m*' in the second row may be coupled to a second drain select line DSL2.

Consequentially, the memory block BLKb of FIG. 5 may have an equivalent circuit similar to that of the memory block BLKa of FIG. 4 except that a pipe transistor PT is excluded from each cell string.

In an embodiment, instead of the first to m-th bit lines BL1 to BLm, even bit lines and odd bit lines may be provided. Even-numbered cell strings, among the cell strings CS11' to CS1*m*' or CS21' to CS2*m*' arranged in a row direction, may be coupled to respective even bit lines. Odd-numbered cell strings, among the cell strings CS11' to CS1*m*' or CS21' to CS2*m*' arranged in the row direction, may be coupled to respective odd bit lines.

In an embodiment, one or more of first to n-th memory cells MC1 to MCn may be used as dummy memory cells. For example, the one or more dummy memory cells are provided to reduce an electric field between the source select transistor SST and the memory cells MC1 to MCn. Alternatively, the one or more dummy memory cells are provided to reduce an electric field between the drain select transistor DST and the memory cells MC1 to MCn. As the number of dummy memory cells that are provided increases, the reliability of operation of the memory block BLKb may be improved, whereas the size of the memory block BLKb may increase. As the number of dummy memory cells that are provided decreases, the size of the memory block BLKb may decrease, whereas the reliability of operation of the memory block BLKb may be deteriorated.

In order to efficiently control the one or more dummy memory cells, respective dummy memory cells may have required threshold voltages. Before or after an erase operation on the memory block BLKb is performed, program operations may be performed on all or some of the dummy memory cells. When the erase operation is performed after the program operations have been performed, the respective dummy memory cells may have required threshold voltages by controlling voltages to be applied to dummy word lines coupled to respective dummy memory cells.

Figure 6:
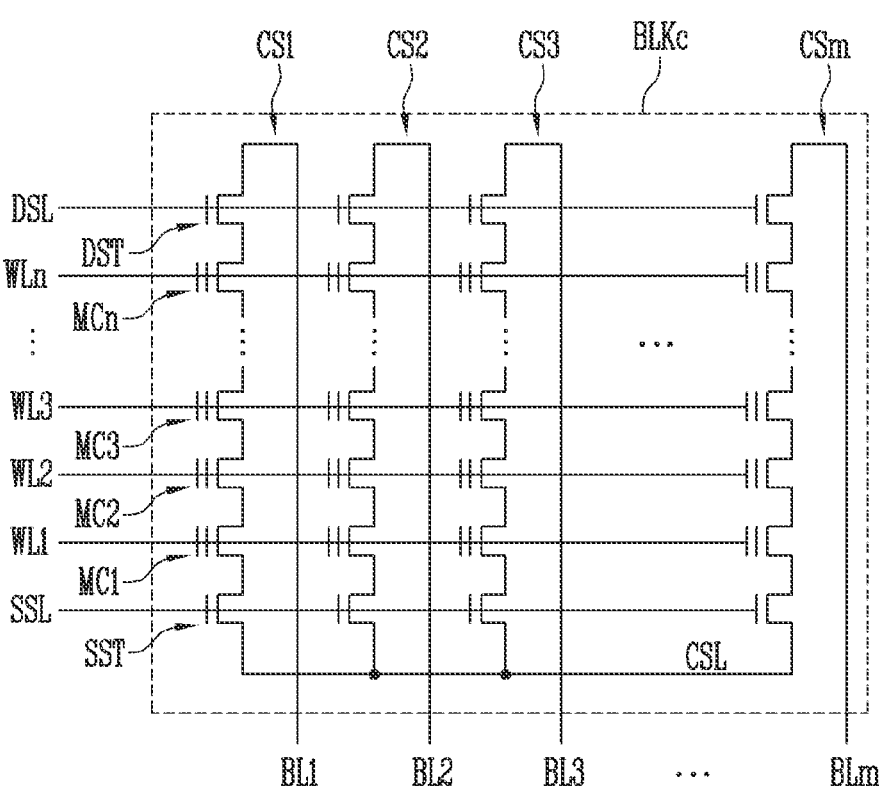
FIG. 6 is a circuit diagram illustrating an example of a memory block BLKc of the memory blocks BLK1 to BLKz included in the memory cell array of FIG. 2 according to an embodiment of the present disclosure.

FIG. 6 is a circuit diagram illustrating an example of a memory block BLKc of the memory blocks BLK1 to BLKz included in the memory cell array 110 of FIG. 2 according to an embodiment of the present disclosure.

Referring to FIG. 6, the memory block BLKc may include a plurality of cell strings CS1 to CSm. The plurality of cell strings CS1 to CSm may be coupled to a plurality of bit lines BL1 to BLm, respectively. Each of the cell strings CS1 to CSm includes at least one source select transistor SST, first to n-th memory cells MC1 to MCn, and at least one drain select transistor DST.

The select transistors SST and DST and the memory cells MC1 to MCn may have similar structures. In an embodiment, each of the select transistors SST and DST and the memory cells MC1 to MCn may include a channel layer, a tunneling insulating layer, a charge storage layer, and a blocking insulating layer. The source select transistor SST in each cell string is coupled between a common source line CSL and the memory cells MC1 to MCn.

The first to n-th memory cells MC1 to MCn in each cell string are coupled between the source select transistor SST and the drain select transistor DST.

The drain select transistor DST of each cell string is coupled between the corresponding bit line and the memory cells MC1 to MCn.

The memory cells coupled to the same word line may constitute a single page. The cell strings CS1 to CSm may be selected by selecting the drain select line DSL. One page may be selected from the selected cell strings by selecting one of the word lines WL1 to WLn.

In an embodiment, instead of the first to m-th bit lines BL1 to BLm, even bit lines and odd bit lines may be provided. Among the cell strings CS1 to CSm, even-numbered cell strings may be coupled to the even bit lines, respectively, and odd-numbered cell strings may be coupled to the odd bit lines, respectively.

Figure 7:
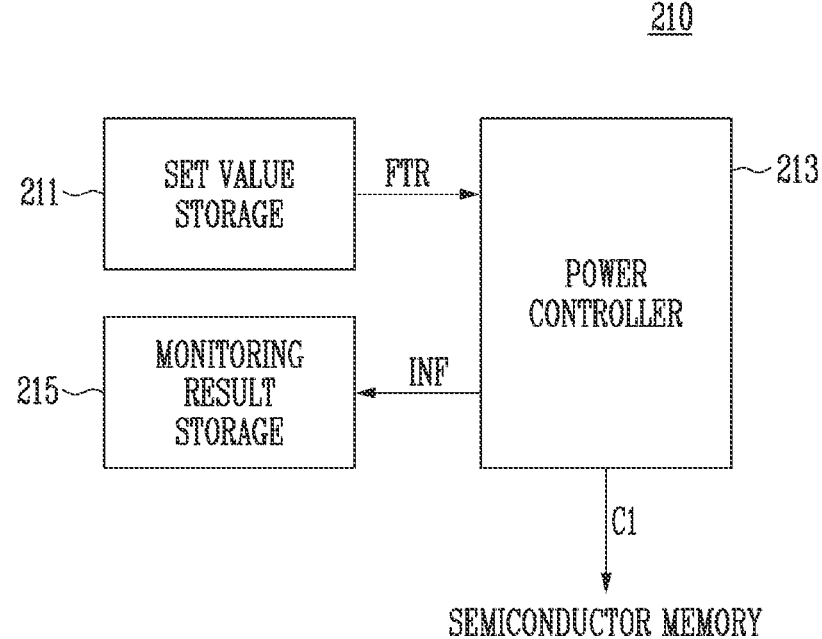
FIG. 7 is a block diagram illustrating the power monitor illustrated in FIG. 1 according to an embodiment of the present disclosure.

FIG. 7 is a block diagram illustrating the power monitor illustrated in FIG. 1 according to an embodiment of the present disclosure.

Referring to FIG. 7, the power monitor 210 may include a set value storage 211, a power controller 213, and a monitoring result storage 215. The set value storage 211 may store set values FTR used to monitor the auxiliary power supply 400. The set value storage 211 may transfer the stored set values FTR to the power controller 213.

The power controller 213 may transfer a control signal C1 for controlling the operation of monitoring the auxiliary power supply 400 to the auxiliary power supply 400 based on the set values FTR. The auxiliary power supply 400 may perform a monitoring operation in response to the control signal C1. The results of operation of monitoring the auxiliary power supply 400 may be transferred to the power controller 213 or may be measured by the power controller 213.

The power controller 213 may transfer monitoring information INF indicating the results of the operation of monitoring the auxiliary power supply 400 to the monitoring result storage 215. The monitoring result storage 215 may store the received monitoring information INF. Also, when the storage device 1000 receives a request for monitoring information from the host device 300, the monitoring information INF stored in the monitoring result storage 215 may be transferred to the host device 300.

Figure 8:
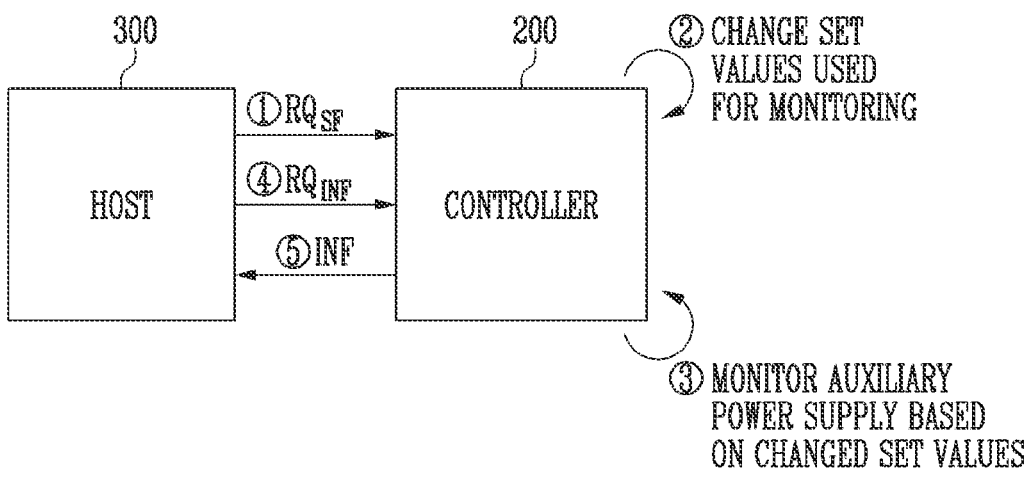
FIG. 8 is a diagram for describing a process for monitoring an auxiliary power supply of a storage device and transferring monitoring information to a host device according to an embodiment of the present disclosure.

FIG. 8 is a diagram for describing a process for monitoring the auxiliary power supply of a storage device and transferring monitoring information to a host device according to an embodiment of the present disclosure.

Referring to FIG. 8, the host device 300 transfers a set value change request $RQ_{SF}$ to the controller 200 of the storage device 1000 (①). The request $RQ_{SF}$ may be generated by the request generator 310 of the host device 300. The controller 200 of the storage device 1000 may change set values used to monitor the auxiliary power supply 400 in response to the received request $RQ_{SF}$ (②). In detail, the set values before being changed, which are stored in the set value storage 211 illustrated in FIG. 7, may be removed.

Also, the set value storage 211 may store the set values that have changed in response to the request $RQ_{SF}$ from the host device 300.

The controller 200 monitors the auxiliary power supply 400 based on the changed set values (③). In detail, the power controller 213 of the power monitor 210 generates a control signal C1 for controlling the operation of monitoring the auxiliary power supply 400 based on the changed set values FTR. The auxiliary power supply 400 may perform a monitoring operation in response to the control signal C1, and the results of performing the monitoring operation may be transferred from the auxiliary power supply 400 to the power controller 213 or may be measured by the power controller 213. The power controller 213 transfers monitoring information INF indicating the results of monitoring to the monitoring result storage 215. The monitoring result storage 215 may store the received monitoring information INF.

The host device 300 transfers a monitoring information request $RQ_{INF}$ for the auxiliary power supply 400 to the controller 200 of the storage device 1000 (④). The monitoring information request $RQ_{INF}$ is transferred to the controller 200 of the storage device 1000 according to the need of the host device 300, and is not necessarily transferred after the set value change request $RQ_{SF}$. The set value change request $RQ_{SF}$ and the monitoring information request $RQ_{INF}$ are independent of each other. However, in FIG. 8, for convenience of description, an example in which, after the set value change request $RQ_{SF}$, the monitoring information request $RQ_{INF}$ is transferred to the controller 200 is illustrated.

In response to the monitoring information request $RQ_{INF}$, the controller 200 transfers the monitoring information INF to the host device 300 (⑤). In detail, the monitoring result storage 215 of the power monitor 210 may transfer the stored monitoring information INF to the host device 300.

FIG. 9 is a flowchart illustrating a method of operating a storage device according to an embodiment of the present disclosure. That is, FIG. 9 illustrates the method, described above with reference to FIGS. 7 and 8, in the form of a flowchart from the standpoint of the storage device.

Hereinafter a method of operating the storage device according to an embodiment of the present disclosure will be described with reference to FIG. 8 together with FIG. 9.

Referring to FIG. 9, the method of operating the storage device according to an embodiment of the present disclosure may include operation S110 of receiving a set value change request from a host device, operation S130 of changing set values used for an operation of monitoring an auxiliary power supply in response to the set value change request, operation S150 of performing the operation of monitoring the auxiliary power supply based on the changed set values, and operation S170 of storing the results of performing the monitoring operation as monitoring information.

Operation S110 may correspond to operation ① of FIG. 8. In detail, a set value change request $RQ_{SF}$, generated by the request generator 310 of the host device 300, may be received by the storage device 1000.

At operation S130, the storage device may change the set values used for the operation of monitoring the auxiliary power supply 400 in response to the received set value change request $RQ_{SF}$. Operation S130 may correspond to operation ② of FIG. 8. In detail, the storage device 1000 may remove set values before being changed, stored in the set value storage 211, and may store the set values, having changed in response to the request $RQ_{SF}$ from the host device 300, in the set value storage 211.

At operation S150, the storage device 1000 may perform the operation of monitoring the auxiliary power supply based on the changed set values FTR. Operation S150 may correspond to operation 3 of FIG. 8. In detail, the power controller 213 of the power monitor 210 generates a control signal C1 for controlling the operation of monitoring the auxiliary power supply 400 based on the changed set values FTR. The auxiliary power supply 400 may perform a monitoring operation in response to the control signal C1, and the results of performing monitoring operation may be transferred from the auxiliary power supply 400 to the power controller 213 or may be measured by the power controller 213.

At operation S170, the storage device 1000 may store the results of performing the monitoring operation, as monitoring information INF, in the monitoring result storage 215. More specifically, the power controller 213 transfers the monitoring information INF indicating the results of monitoring to the monitoring result storage 215. The monitoring result storage 215 may store the received monitoring information INF.

Referring to FIG. 9, the method of operating the storage device according to an embodiment of the present disclosure may further include operation S190 of transferring the monitoring information, stored at operation S170, to the host device 300. Operation S190 may correspond to operation ⑤ of FIG. 8. In accordance with an embodiment, as described above with reference to FIG. 8, operation S190 of transferring the monitoring information to the host device may be performed in response to a monitoring information request $RQ_{INF}$ received from the host device 300.

In accordance with an embodiment, operation S190 of transferring the monitoring information to the host device may be performed regardless of a request received from the host device 300. In this case, when performance of the operation of monitoring the auxiliary power supply 400 is completed and monitoring information is generated, the monitoring information may be transferred to the host device 300 even if no request is received from the host device 300. The host device 300 may receive the monitoring information INF, and may then determine whether an abnormality or a symptom occurs in the auxiliary power supply 400 included in the storage device 1000. When it is determined that an abnormality is present in the auxiliary power supply 400, or when it is expected that an abnormality will occur in the auxiliary power supply 400 in the near future, the host device 300 may additionally perform an operation of backing up the data stored in the storage device 1000.

In an embodiment, the set values used for the monitoring operation may include a period (cycle) during which the monitoring operation is performed. In this case, the period during which the monitoring operation is performed on the auxiliary power supply 400 may be changed in response to the change request $RQ_{SF}$ received from the host device 300. The storage device 1000 may periodically perform the monitoring operation on the auxiliary power supply 400, wherein the period may be stored in the set value storage 211. When the period is 24 hours, the storage device 1000 may perform the monitoring operation on the auxiliary power supply 400 every 24 hours. In this case, when the host device 300 desires to increase the frequency with which the monitoring operation is performed, the host device 300 may transfer a change request $RQ_{SF}$ for reducing the period to the storage device 1000. For example, when a period value included in the change request $RQ_{SF}$ corresponds to 12 hours, the storage device 1000 may change the period of performance of the monitoring operation, stored in the set value storage 211, to 12 hours in response to the change request $RQ_{SF}$. Thereafter, the operation of monitoring the auxiliary power supply 400 may be performed every 12 hours.

In other embodiments, the set values used for the monitoring operation may include reference charged/discharged voltages for the auxiliary power supply 400. The corresponding embodiment will be described in detail below with reference to FIGS. 10A to 10C.

Figure 10A:
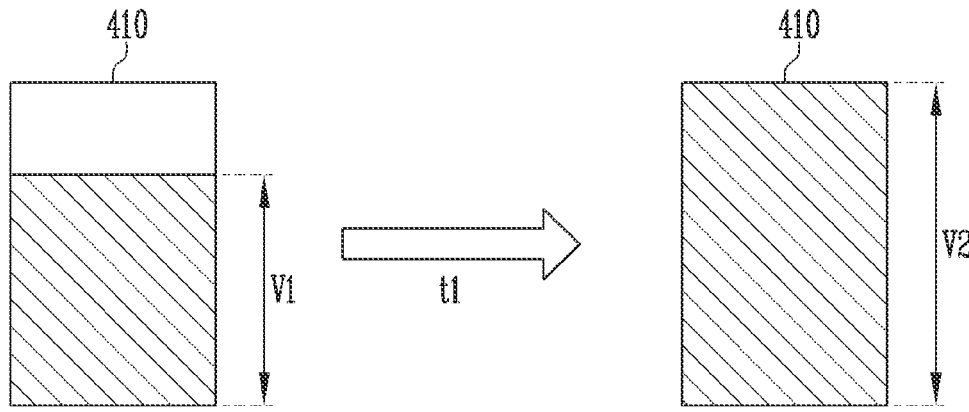
FIGS. 10A to 10C are diagrams for describing embodiments in which set values used for a monitoring operation are changed.
Figure 10B:
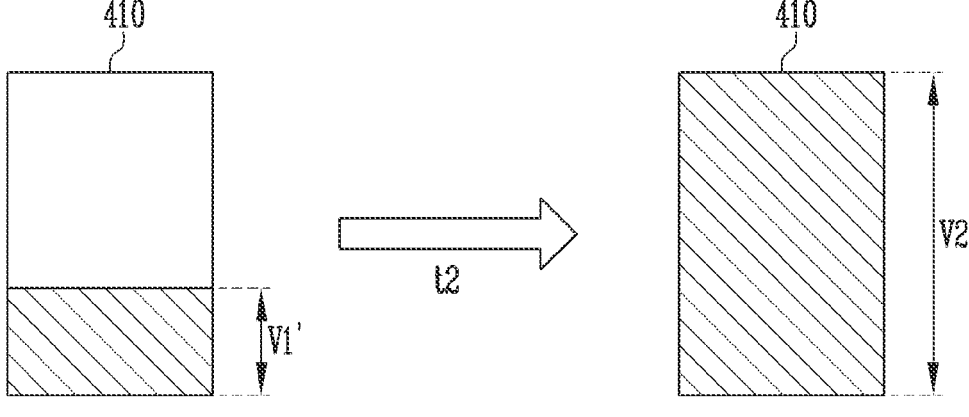
Figure 10C:
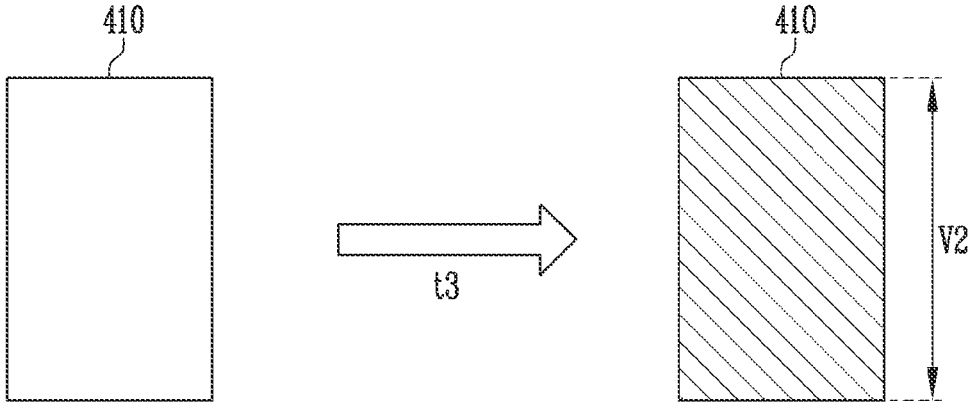

FIGS. 10A to 10C are diagrams for describing embodiments in which set values used for a monitoring operation are changed according to an embodiment of the present disclosure. In FIGS. 10A to 10C, the auxiliary power supply 400 may be implemented as a capacitor 410.

The operation of monitoring the auxiliary power supply 400 implemented as the capacitor 410 may be performed in such a way as to discharge the voltage of the capacitor to a preset reference discharged voltage and thereafter measure the time it takes for the capacitor to be charged to a preset reference charged voltage. Referring to FIG. 10A, the capacitor 410 is discharged to a reference discharged voltage V1, and thereafter the time t1 it takes for the capacitor 410 to be charged to a reference charged voltage V2 is measured.

In accordance with an embodiment of the present disclosure, set values used for the monitoring operation may include at least one of the reference discharged voltage V1 and the reference charged voltage V2. In accordance with the embodiments of FIGS. 10A to 10C, embodiments for changing the reference discharged voltage V1 are illustrated.

That is, when the host device 300 desires to decrease the reference discharged voltage, the host device 300 may transfer a change request $RQ_{SF}$ for the reference discharged voltage to the storage device 1000. The storage device 1000 may change the reference discharged voltage used for the operation of monitoring the auxiliary power supply 400 to a value V1' corresponding to the change request $RQ_{SF}$ in response to reception of the change request $RQ_{SF}$. Thereafter, the operation of monitoring the auxiliary power supply 400 may be performed by measuring the time t2 it takes for the capacitor 410 to be charged from the changed reference discharged voltage V1' to the reference charged voltage V2.

When the reference discharged voltage is decreased, as illustrated in FIG. 10B, the time t2 required for the monitoring operation may be increased, compared to the case of FIG. 10A, but the accuracy of the monitoring operation may be improved. Accordingly, as illustrated in FIG. 10C, when more precise results of the monitoring operation are required, the host device 300 may transfer a change request $RQ_{SF}$ to change the reference discharged voltage used for the operation of monitoring the auxiliary power supply 400 to a ground voltage to the storage device 1000. The storage device 1000 may change the reference discharged voltage used for the operation of monitoring the auxiliary power supply 400 to the ground voltage in response to reception of the change request $RQ_{SF}$. Thereafter, the operation of monitoring the auxiliary power supply 400 may be performed by measuring the time t3 it takes for the capacitor 410 to be charged from the changed reference discharged voltage (0 V) to the reference charged voltage V2. Although the time t3 is longer than the time t1 and the time t2, the accuracy of the monitoring operation corresponding to the time t3 may be improved.

FIGS. 11A to 11D are diagrams for describing the case where required power necessary to operate a storage device in a first mode is insufficient according to an embodiment of the present disclosure. In the present specification, the first mode may be a normal mode, among the operation modes of the storage device.

Figure 11A:
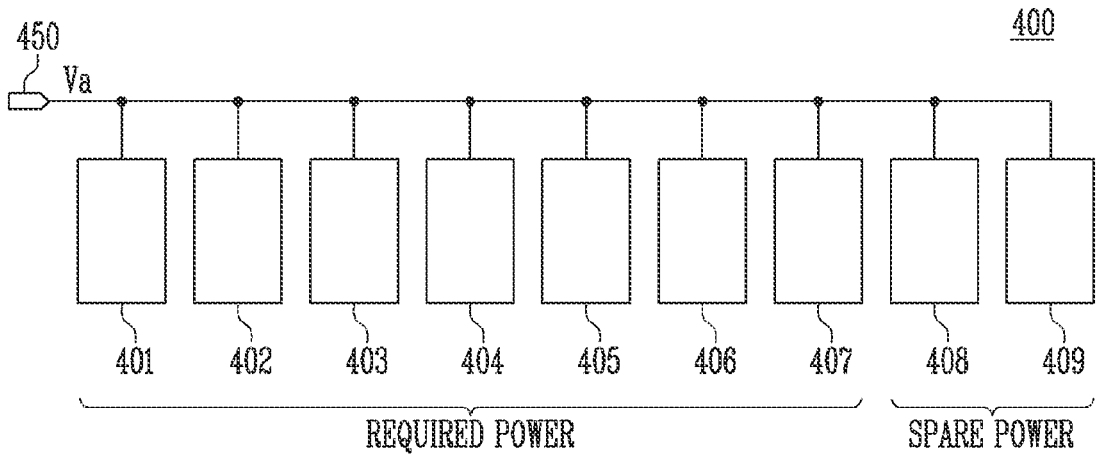
FIGS. 11A to 11D are diagrams for describing the case where required power necessary to operate a storage device in a first mode is insufficient according to an embodiment of the present disclosure.

Referring to FIG. 11A, the auxiliary power supply 400 may include a plurality of sub-power supplies 401 to 409. The plurality of sub-power supplies 401 to 409 may be coupled in common to an auxiliary power output terminal 450. By means of this, each of the plurality of sub-power supplies 401 to 409 may transfer an auxiliary supply voltage Va to the auxiliary power output terminal 450. In an embodiment, each of the plurality of sub-power supplies 401 to 409 may be configured to include at least one capacitor. Hereinafter, the case where the power strengths of respective sub-power supplies 401 to 409 are substantially equal to each other will be described as an example.

Each of the plurality of sub-power supplies 401 to 409 may charge a certain amount of auxiliary power. In preparation for the case where the external power of the storage device 1000 is suddenly interrupted (SPO), the storage device 1000 needs to perform a series of operations. For example, when the storage device 1000 includes a write buffer, the amount of power required in order to store all write data, stored in the write buffer, in the semiconductor memory device 100 in the case where external power is suddenly interrupted may be determined according to design. Further, when the storage device 1000 includes a map buffer, the amount of power required in order to store all map data, stored in the map buffer, in the semiconductor memory device 100 in the case where external power is suddenly interrupted may be determined according to design. In addition, the amount of power required for the operations to be performed in the case where the external power of the storage device 1000 is suddenly interrupted may be determined according to design.

Referring to FIG. 11A, amounts of power corresponding to seven sub-power supplies 401 to 407 are illustrated as being required power. Moreover, the two sub-power supplies 408 and 409 correspond to spare power, and are configured to substitute for sub-power supplies in which defects occur, among the sub-power supplies 401 to 407. Referring to the illustration in FIG. 11A, the auxiliary power supply 400 has required power and more as the spare power.

Figure 11B:
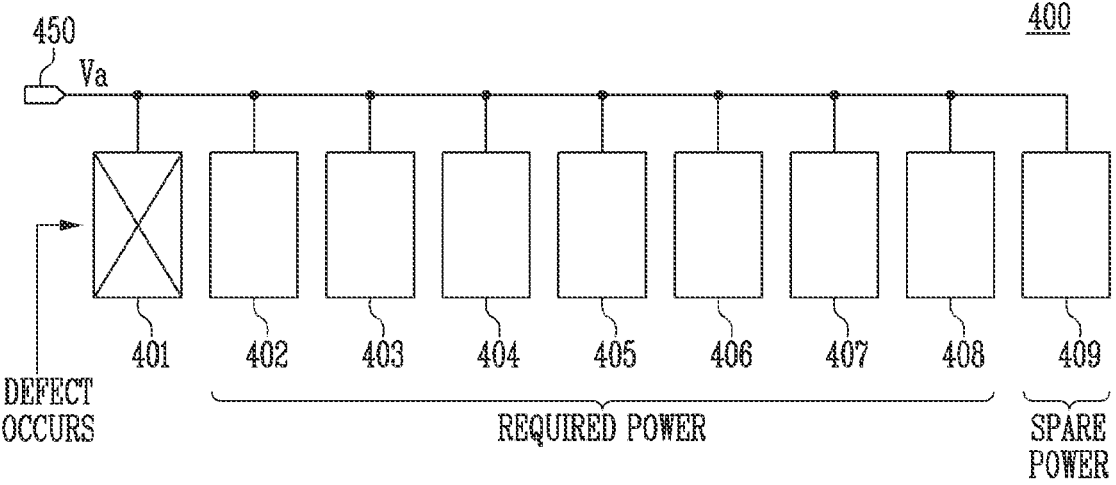

Referring to FIG. 11B, a situation in which a defect occurs in a sub-power supply 401, among the sub-power supplies 401 to 409, is illustrated. In this case, although the sub-power supply 401 is not used, eight sub-power supplies 402 to 409 are available, and thus required operations may be performed using an auxiliary supply voltage Va from the auxiliary power supply 400 even if external power of the storage device 1000 is suddenly interrupted (SPO).

Figure 11C:
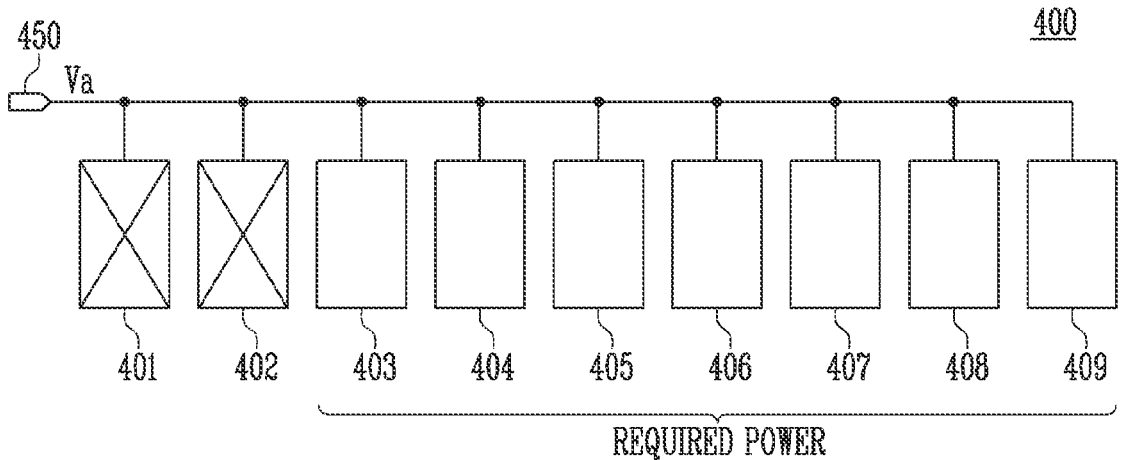

Referring to FIG. 11C, a situation in which defects occur in two sub-power supplies 401 and 402, among the sub-power supplies 401 to 409, is illustrated. In this case, although the two sub-power supplies 401 and 402 are not used, seven sub-power supplies 403 to 409 are available, and thus required operations may be performed using an auxiliary supply voltage Va from the auxiliary power supply 400 even if external power of the storage device 1000 is suddenly interrupted.

Figure 11D:
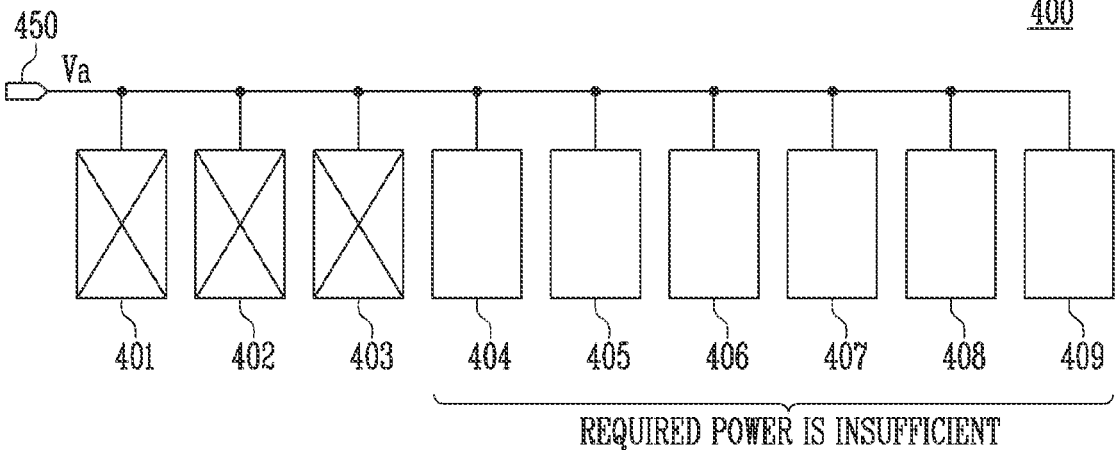

Referring to FIG. 11D, a situation in which defects occur in three sub-power supplies 401, 402, and 403 among the sub-power supplies 401 to 409, is illustrated. In this case, three sub-power supplies 401, 402, and 403 are not usable, and available power is insufficient and less than required power even if the remaining six sub-power supplies 404 to 409 are used. Therefore, in accordance with the situation illustrated in FIG. 11D, when the external power of the storage device 1000 is suddenly interrupted, the power of the auxiliary power supply 400 may be exhausted before all required operations are performed. This is the cause of deteriorating the stability of the storage device 1000.

In accordance with an embodiment of the present disclosure, the operation of monitoring the auxiliary power supply 400 may include an operation of determining whether defects occur in the plurality of sub-power supplies included in the auxiliary power supply 400. In accordance with an embodiment of the present disclosure, monitoring information INF transferred from the storage device 1000 to the host device 300 may include information indicating the number of sub-power supplies that are normally operated, among the sub-power supplies 401 to 409 included in the auxiliary power supply 400. The host device 300 may determine, based on the number of sub-power supplies that are normally operated, among the sub-power supplies 401 to 409, whether power required for the storage device 1000 to perform necessary operations when external power is suddenly interrupted is insufficient. When it is determined that the required power is insufficient, the host device 300 changes the operation mode of the storage device 1000. Due to the changed operation mode, the number of operations to be performed when external power is suddenly interrupted may be reduced. Below, a description will be made in detail with reference to FIG. 12.

Figure 12:
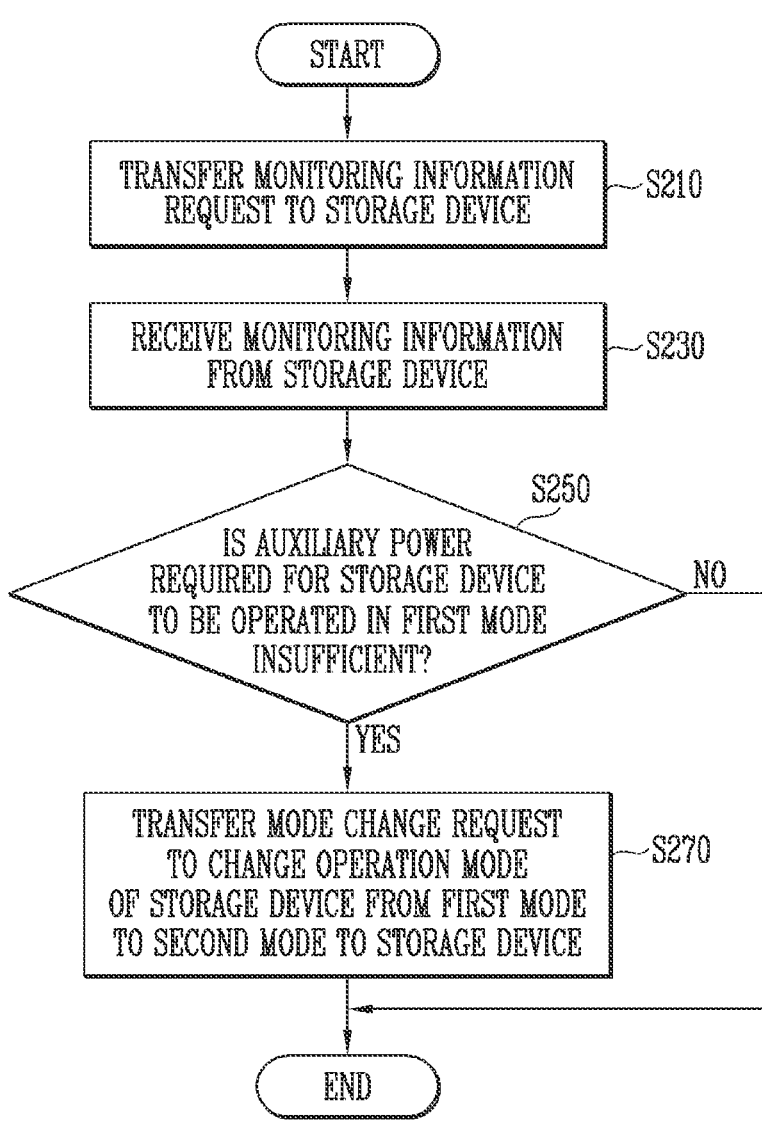
FIG. 12 is a flowchart illustrating the operation of a host device according to an embodiment of the present disclosure.

FIG. 12 is a flowchart illustrating the operation of a host device according to an embodiment of the present disclosure.

Referring to FIG. 12, a method of operating the host device according to an embodiment of the present disclosure may include operation S210 of transferring a monitoring information request $RQ_{INF}$ to the storage device, operation S230 of receiving monitoring information INF from the storage device, and operation S250 of determining, based on the monitoring information INF, whether auxiliary power required for the storage device to be operated in a first mode is insufficient.

At operation S210, the monitoring information request $RQ_{INF}$ transferred from the host device 300 to the storage device 1000 may be a request for information indicating the number of sub-power supplies that are normally operated, among a plurality of sub-power supplies 401 to 409 included in the auxiliary power supply 400. The storage device 1000 may transfer the monitoring information INF indicating the number of sub-power supplies that are normally operated, among the sub-power supplies 401 to 409 included in the auxiliary power supply 400, to the host device 300 in response to the monitoring information request $RQ_{INF}$.

At operation S230, the host device 300 receives the monitoring information INF from the storage device. As described above, the monitoring information INF may include information about the number of sub-power supplies that are normally operated, among the sub-power supplies 401 to 409 included in the auxiliary power supply 400.

At operation S250, the host device 300 determines, based on the monitoring information INF, whether auxiliary power required for the storage device 1000 to be operated in the first mode is insufficient. For example, when the storage device 1000 is operated in the first mode, auxiliary power required in the case where the external power of the storage device 1000 is suddenly interrupted may be power corresponding to, for example, seven sub-power supplies, as illustrated in FIG. 11A to 11D. In the first mode, when the external power of the storage device 1000 is suddenly interrupted, the storage device 1000 may be required to perform an operation of storing write data, stored in a write buffer, or map data, stored in a map buffer, in the semiconductor memory device 100.

The method of operating the host device according to the embodiment of the present disclosure may further include, when it is determined that auxiliary power required for the storage device 1000 to be operated in the first mode is insufficient (in case of Yes at operation S250), operation S270 of transferring a mode change request to change the operation mode of the storage device from the first mode to the second mode to the storage device. In response to the mode change request transferred at operation S270, the storage device may change the operation mode from the first mode to the second mode. In the present specification, the first mode may be a normal mode, and the second mode may be a simple mode.

As described above, when auxiliary power required for the storage device to be operated in the first mode is insufficient, the power of the auxiliary power supply 400 may be exhausted before all operations required in the first mode are performed in the event of an SPO. This is the cause of deteriorating the stability of the storage device 1000. Therefore, when auxiliary power required for the storage device 1000 to be operated in the first mode is insufficient, the above-described problem may be solved by changing the operation mode of the storage device from the first mode to the second mode.

In accordance with the present disclosure, the type and/or number of operations, required by the storage device 1000 when an SPO occurs in the second mode, may be limited and/or less than the type and/or number of operations, required by the storage device 1000 when an SPO occurs in the first mode. In an example, capacity allocated to the write buffer in the second mode may be less than that in the first mode. In an example, capacity allocated to the map buffer in the second mode may be less than that in the first mode. In an example, in the second mode, the storage device 1000 may directly store write data, transferred from the host device 300, in the semiconductor memory device 100 without utilizing the write buffer. In an example, in the second mode, the storage device 1000 may be used exclusively for a read operation, and may not perform a write operation any more. In this way, when the operation mode of the storage device is changed from the first mode to the second mode, the type and/or number of operations required to be performed by the storage device in the event of an SPO may be limited and/or reduced, and thus the amount of auxiliary power required may also be reduced. Therefore, when a situation such as that illustrated in FIG. 11D occurs, the host device 300 may control the storage device 1000 so that, even if an SPO occurs, the storage device 1000 is stably operated by changing the operation mode of the storage device 1000.

When it is determined that auxiliary power required for the storage device to be operated in the first mode is not insufficient (in the case of No at operation S250), the operation mode of the storage device 1000 may not be changed.

Figure 13:
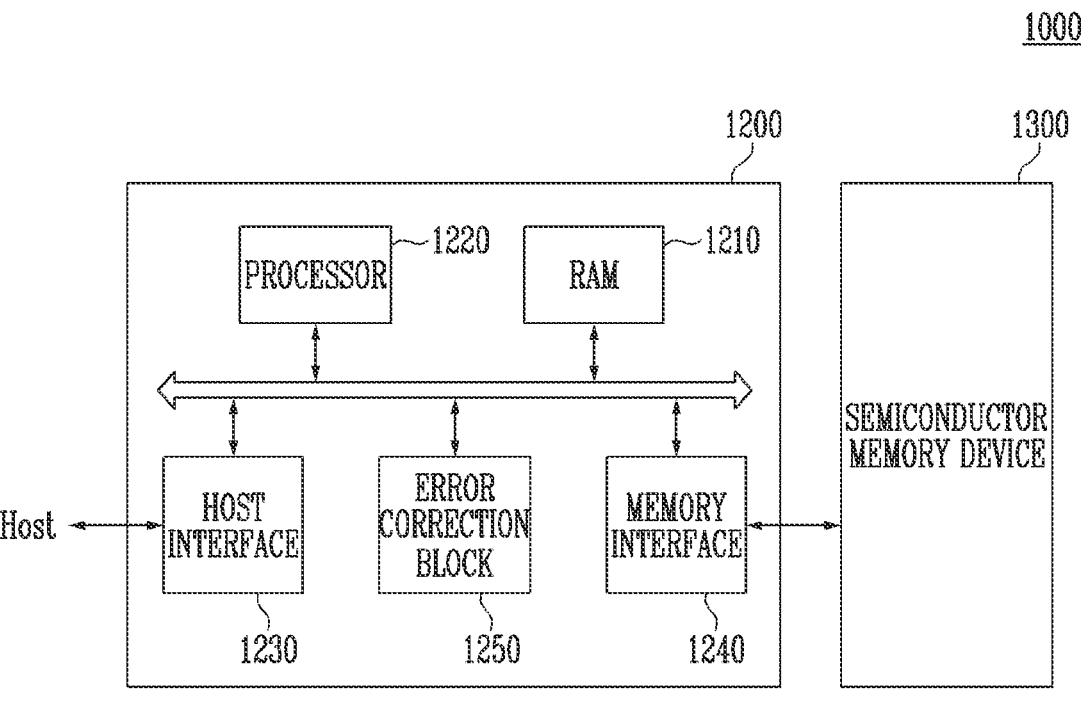
FIG. 13 is a block diagram illustrating a storage device including a semiconductor memory device and a controller.

FIG. 13 is a block diagram illustrating a storage device 1000 including a semiconductor memory device and a controller according to an embodiment of the present disclosure.

The semiconductor memory device 1300 of FIG. 13 may have the same configuration and operation as the semiconductor memory device 100 described with reference to FIG. 2. Hereinafter, repetitive descriptions will be omitted.

The controller 1200 is coupled to a host device Host and the semiconductor memory device 1300. The controller 1200 may access the semiconductor memory device 1300 in response to a request received from the host device Host. For example, the controller 1200 may control read, program, erase, and background operations of the semiconductor memory device 1300. The controller 1200 may provide an interface between the semiconductor memory device 1300 and the host device Host. The controller 1200 may run firmware for controlling the semiconductor memory device 1300.

The controller 1200 includes a random access memory (RAM) 1210, a processor 1220, a host interface 1230, a memory interface 1240, and an error correction block 1250.

The RAM 1210 is used as at least one of a working memory for the processor 1220, a cache memory between the semiconductor memory device 1300 and the host device Host, and a buffer memory between the semiconductor memory device 1300 and the host device Host.

The processor 1220 controls the overall operation of the controller 1200. The processor 1220 may control read, program, erase, and background operations of the semiconductor memory device 1300.

The processor 1220 may run firmware for controlling the semiconductor memory device 1300. The processor 1220 may perform a function of a flash translation layer (FTL). The processor 1220 may translate a logical block address (LBA), provided by the host device Host, into a physical block address (PBA) through the FTL. The FTL may receive the logical block address (LBA) and translate the LBA into a physical block address (PBA) using a mapping table. Examples of an address mapping method performed through the FTL may include various methods according to a mapping unit. Representative address mapping methods include a page mapping method, a block mapping method, and a hybrid mapping method.

The host interface 1230 may include a protocol for performing data exchange between the host device Host and the controller 1200. In an embodiment, the controller 1200 may communicate with the host device Host through at least one of various communication standards or interfaces such as a universal serial bus (USB) protocol, a multimedia card (MMC) protocol, a peripheral component interconnection (PCI) protocol, a PCI-express (PCI-e or PCIe) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, an inter-integrated circuit (I2C) protocol, an improved inter-integrated circuit (13C) protocol, a system management bus (SMBus) protocol, and a private protocol.

The memory interface 1240 may interface with the semiconductor memory device 1300. For example, the memory interface 1240 includes a NAND interface or a NOR interface.

The error correction block 1250 may detect and correct errors in data received from the semiconductor memory device 1300 using an error correction code (ECC). The error correction block 1250 may correct errors in read page data using an ECC. The error correction block 1250 may correct errors using a low density parity check (LDPC) code, a Bose, Chaudhuri, Hocquenghem (BCH) code, a turbo code, a Reed-Solomon code, a convolution code, a recursive systematic code (RSC), or coded modulation such as trellis-coded modulation (TCM), block coded modulation (BCM) or hamming code.

During a read operation, the error correction block 1250 may correct errors from read page data. When a number of error bits exceeding the number of correctable bits are included in the read page data, decoding may fail. When a number of error bits less than or equal to the number of correctable bits are included in the page data, decoding may succeed. A success in decoding indicates that the corresponding read command has passed. A failure in decoding indicates that the corresponding read command has failed. When decoding succeeds, the controller 1200 may output error-corrected page data to the host device Host.

The controller 200 of FIG. 1 may be implemented as the controller 1200 illustrated in FIG. 13. In this case, the power controller 213 included in the power monitor 210 of FIG. 1 may be implemented as firmware run by the processor 1220. Further, the set value storage 211 and the monitoring result storage 215 included in the power monitor 200 may be implemented as the RAM 1210.

The controller 1200 and the semiconductor memory device 1300 may be integrated into a single semiconductor device. In an embodiment, the controller 1200 and the semiconductor memory device 1300 may be integrated into a single semiconductor device to form a memory card. For example, the controller 1200 and the semiconductor memory device 1300 may be integrated into a single semiconductor device and form a memory card, such as a personal computer memory card international association (PCMCIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

The controller 1200 and the semiconductor memory device 1300 may be integrated into a single semiconductor device to form a semiconductor drive (solid state drive: SSD). The SSD includes a storage device configured to store data in a semiconductor memory. When the storage device is used as the SSD, an operation speed of the host device Host coupled to the storage device may be remarkably improved.

In an embodiment, the storage device 1000 may be provided as one of various elements of an electronic device such as a computer, a ultra mobile PC (UMPC), a workstation, a net-book, a personal digital assistants (PDA), a portable computer, a web tablet, a wireless phone, a mobile phone, a smart phone, an e-book, a portable multimedia player (PMP), a game console, a navigation device, a black box, a digital camera, a 3-dimensional (3D) television, a digital audio recorder, a digital audio player, a digital picture recorder, a digital picture player, a digital video recorder, a digital video player, a device capable of transmitting/receiving information in an wireless environment, one of various devices for forming a home network, one of various electronic devices for forming a computer network, one of various electronic devices for forming a telematics network, an RFID device, or one of various elements for forming a computing system.

In an embodiment, the semiconductor memory device 1300 or the storage device 1000 may be mounted in various types of packages. For example, the semiconductor memory device 1300 or the storage device 1000 may be packaged and mounted in a type such as package on package (POP), ball grid arrays (BGAs), chip scale packages (CSPs), plastic leaded chip carrier (PLCC), plastic dual in line package (PDIP), die in waffle pack, die in wafer form, chip on board (COB), ceramic dual in line package (CERDIP), plastic metric quad flat pack (MQFP), thin quad flatpack (TQFP), small outline integrated circuit (SOIC), shrink small outline package (SSOP), thin small outline package (TSOP), system in package (SIP), multi chip package (MCP), wafer-level fabricated package (WFP), or wafer-level processed stack package (WSP).

Figure 14:
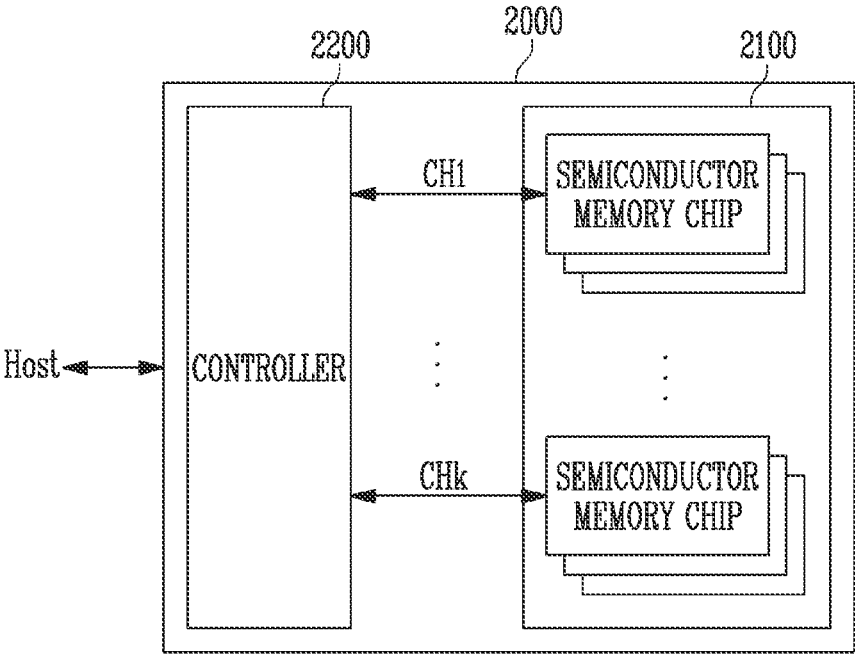
FIG. 14 is a block diagram illustrating an example of application of the storage device of FIG. 13 according to an embodiment of the present disclosure.

FIG. 14 is a block diagram illustrating an example of application of the storage device of FIG. 13 according to an embodiment of the present disclosure.

Referring to FIG. 14, a storage device 2000 includes a semiconductor memory device 2100 and a controller 2200. The semiconductor memory device 2100 may include a plurality of semiconductor memory chips. The semiconductor memory chips may be divided into a plurality of groups.

In FIG. 14, it is illustrated that the plurality of groups respectively communicate with the controller 2200 through first to k-th channels CH1 to CHk. Each semiconductor memory chip may have the same configuration and operation as the semiconductor memory device 1300 described with reference to FIG. 13.

Each group may communicate with the controller 2200 through one common channel. The controller 2200 may have the same configuration as the controller 1200 described with reference to FIG. 13, and may control the plurality of semiconductor memory chips of the semiconductor memory device 2100 through the plurality of channels CH1 to CHk.

In FIG. 14, a plurality of semiconductor memory chips have been described as being coupled to each channel. However, it will be understood that the storage device 2000 may be modified such that a single semiconductor memory chip is coupled to each channel.

Figure 15:
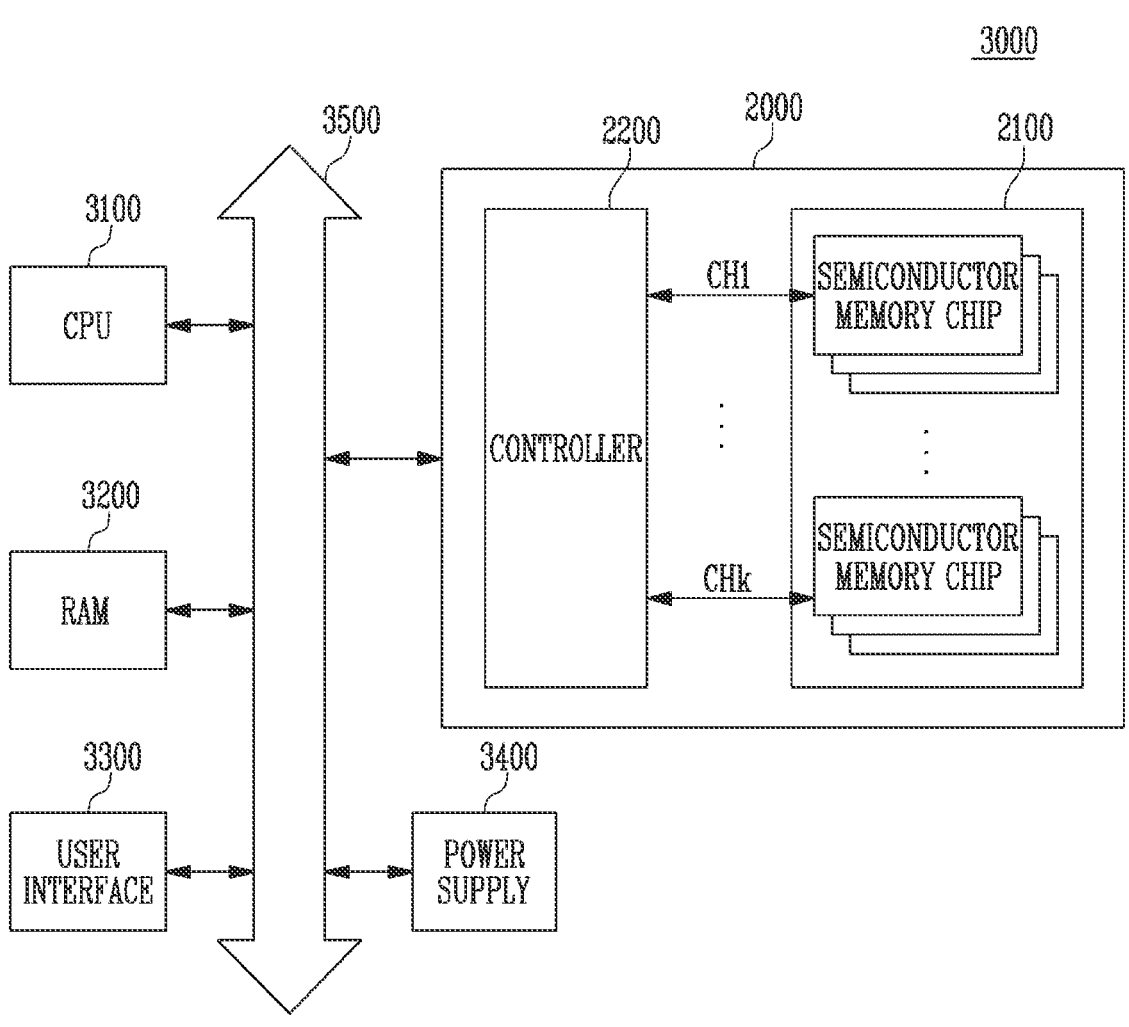
FIG. 15 is a block diagram illustrating a computing system including the storage device illustrated with reference to FIG. 14 according to an embodiment of the present disclosure.

FIG. 15 is a block diagram illustrating a computing system including the storage device illustrated with reference to FIG. 14 according to an embodiment of the present disclosure.

Referring to FIG. 15, a computing system 3000 includes a central processing unit (CPU) 3100, a RAM 3200, a user interface 3300, a power supply 3400, a system bus 3500, and a storage device 2000.

The storage device 2000 is electrically connected to the CPU 3100, the RAM 3200, the user interface 3300, and the power supply 3400 through the system bus 3500. Data provided through the user interface 3300 or processed by the CPU 3100 may be stored in the storage device 2000.

In FIG. 15, the semiconductor memory chips are illustrated as being coupled to the system bus 3500 through the controller 2200. However, the semiconductor memory chips may be directly coupled to the system bus 3500. Here, a function of the controller 2200 may be performed by the CPU 3100 and the RAM 3200.

In FIG. 15, the storage device 2000 described with reference to FIG. 14 is illustrated as being provided. However, the storage device 2000 may be replaced with the storage device 1000 described with reference to FIG. 13. In an embodiment, the computing system 3000 may include both the storage devices 1000 and 2000 described with reference to FIGS. 13 and 14.

The present disclosure may provide a storage device that is capable of efficiently monitoring auxiliary power, and a method of operating the storage device.

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A method of operating a storage device, comprising:

receiving, from an external device, a request to change a set value used for an operation of monitoring an auxiliary power supply of the storage device;

changing the set value in response to the request;

performing the operation based on the changed set value;

receiving a mode change request from the external device; and changing an operation mode of the storage device from a first mode to a second mode in response to the mode change request, wherein the operation includes an operation of measuring a time taken for the auxiliary power supply to be charged from a reference discharged voltage to a reference charged voltage.

2. The method according to claim 1, wherein the auxiliary power supply is configured to supply power to the storage device when external power supplied to the storage device is interrupted.

3. The method according to claim 1, wherein the set value includes a period in which the operation is performed.

4. The method according to claim 1, wherein the set value includes at least one of the reference discharged voltage and the reference charged voltage.

5. The method according to claim 1, further comprising storing monitoring information indicating a result of performing the operation.

6. The method according to claim 5, further comprising transferring the monitoring information to the external device.

7. The method according to claim 6, wherein the transferring is performed in response to a monitoring information request received from the external device.

8. The method according to claim 6, wherein the auxiliary power supply comprises a plurality of sub-power supplies, and wherein the monitoring information includes information about a number of sub-power supplies that are normally operated among the plurality of sub-power supplies.

9. The method according to claim 6, wherein the storage device in the first mode requires auxiliary power used for an operation of storing at least part of data, stored in a buffer included in the storage device, in a semiconductor memory device included in the storage device when external power supplied to the storage device is interrupted.

10. The method according to claim 6, wherein the mode change request is received when the auxiliary power required in the first mode is insufficient.

11. The method according to claim 10, wherein the storage device in the second mode requires auxiliary power less than the auxiliary power required in the first mode.

12. The method according to claim 10, wherein the storage device comprises buffers, and a size of a buffer used in the second mode is less than a size of a buffer used in the first mode.

13. The method according to claim 10, wherein the storage device is used exclusively for a read operation in the second mode.

14. A storage device, comprising:

a semiconductor memory device including a plurality of memory cells;

an auxiliary power supply configured to supply an auxiliary supply voltage to the semiconductor memory device when external power supplied to the semiconductor memory device is interrupted; and a controller configured to control operations of the semiconductor memory device and the auxiliary power supply, receive a mode change request from an external device, and change an operation mode of the storage device from a first mode to a second mode in response to the mode change request, wherein the controller comprises a power monitor configured to change a set value used for an operation of monitoring the auxiliary power supply in response to a set value change request received from the external device, and wherein the operation of monitoring includes an operation of measuring a time taken for the auxiliary power supply to be charged from a reference discharged voltage to a reference charged voltage.

15. The storage device according to claim 14, wherein the power monitor comprises:

a set value storage configured to store at least one set value used for the operation of monitoring;

a power controller configured to control the operation of monitoring based on the at least one set value; and a result storage configured to store a result of the operation of monitoring.

16. The storage device according to claim 15, wherein the set value includes a period in which the operation of monitoring is performed.

17. The storage device according to claim 15, wherein the set value includes at least one of the reference discharged voltage and the reference charged voltage.

* * * * *